(12) United States Patent
Palat et al.

(10) Patent No.: US 10,904,800 B2
(45) Date of Patent: Jan. 26, 2021

(54) QUALITY OF SERVICE FLOW TO DATA RADIO BEARER MAPPING OVERRIDE BIT

(71) Applicant: APPLE INC., Cupertino, CA (US)

(72) Inventors: Sudeep Palat, Gloucestershire (GB); Richard Burbidge, Oxfordshire (GB); Yujian Zhang, Beijing (CN); Alexandre Saso Stojanovski, Paris (FR); Jerome Parron, Fuerth (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/475,851

(22) PCT Filed: Feb. 2, 2018

(86) PCT No.: PCT/US2018/016635
§ 371 (c)(1),
(2) Date: Jul. 3, 2019

(87) PCT Pub. No.: WO2018/144855
PCT Pub. Date: Aug. 9, 2018

(65) Prior Publication Data
US 2019/0357086 A1    Nov. 21, 2019

Related U.S. Application Data

(60) Provisional application No. 62/454,675, filed on Feb. 3, 2017.

(51) Int. Cl.
*H04W 28/24* (2009.01)
*H04W 76/27* (2018.01)
(Continued)

(52) U.S. Cl.
CPC .......... *H04W 28/24* (2013.01); *H04L 5/0055* (2013.01); *H04W 28/0268* (2013.01); *H04W 76/27* (2018.02)

(58) Field of Classification Search
CPC ..... H04W 48/06; H04W 48/16; H04W 36/26; H04W 84/12; H04W 8/18; H04W 88/06;
(Continued)

(56) References Cited

U.S. PATENT DOCUMENTS

2002/0141393 A1* 10/2002 Eriksson ................. H04L 69/16
370/352
2006/0218271 A1* 9/2006 Kasslin ................... H04L 43/06
709/224
(Continued)

OTHER PUBLICATIONS

Ericsson, "Qos framework for NR", Tdoc R2-1700435, 3GPP TSG-RAN WG2 Meeting #96-AH, Spokane, Washington, ISA, Agenda Item 3.2.1.3—NR—User Plane—Qos, Jan. 17-19, 2017, 5 pages.
(Continued)

*Primary Examiner* — Jung Liu
(74) *Attorney, Agent, or Firm* — Stoel Rives LLP (57) ABSTRACT

Disclosed are apparatuses for quality of service (QoS) flow to data radio bearer (DRB) mapping override bits. An apparatus of a user equipment (UE), includes one or more data storage devices, and one or more processors operably coupled to the one or more data storage devices. The one or more data storage devices are configured to store data corresponding to mapping of QoS flows to data radio bearers. The one or more processors are configured to map one or more QoS flows to a DRB in an uplink (UL) responsive to receipt, by the UE from a cellular base station, of a user plane packet in a downlink (DL) through the DRB if an override bit of the user plane packet indicates that reflective mapping should apply.

24 Claims, 7 Drawing Sheets

(51) Int. Cl.
  *H04L 5/00* (2006.01)
  *H04W 28/02* (2009.01)
(58) Field of Classification Search
  CPC . H04W 24/10; H04W 72/1231; H04W 88/08; H04W 88/0852; H04L 43/06; H04L 1/0026; H04L 1/0027; H04L 43/16; H04L 43/0823; H04L 41/5032; H04L 43/0852
  See application file for complete search history.

(56) References Cited

U.S. PATENT DOCUMENTS

| | | | | |
|---|---|---|---|---|
| 2007/0002868 | A1* | 1/2007 | Qian | H04W 28/24 370/395.21 |
| 2007/0217349 | A1* | 9/2007 | Fodor | H04W 48/18 370/310.2 |
| 2010/0103863 | A1* | 4/2010 | Ulupinar | H04L 29/12207 370/315 |
| 2012/0026880 | A1* | 2/2012 | Miller | H04W 4/90 370/235 |
| 2012/0026947 | A1* | 2/2012 | Miller | H04W 28/24 370/329 |
| 2014/0162676 | A1* | 6/2014 | Shaw | H04W 76/00 455/452.2 |
| 2014/0226470 | A1* | 8/2014 | Kim | H04W 28/0268 370/230 |
| 2014/0233380 | A1* | 8/2014 | Kim | H04L 47/24 370/230 |
| 2015/0257159 | A1* | 9/2015 | Speicher | H04W 28/10 370/235 |
| 2015/0271838 | A1* | 9/2015 | Szilagyi | H04W 72/1263 370/336 |
| 2016/0227443 | A1* | 8/2016 | Tomici | H04L 61/203 |
| 2016/0227467 | A1* | 8/2016 | Tomici | H04W 8/18 |
| 2017/0085452 | A1* | 3/2017 | Kato | H04L 43/0811 |
| 2017/0111826 | A1* | 4/2017 | Sankar | H04W 72/0413 |
| 2018/0220327 | A1* | 8/2018 | Karampatsis | H04W 28/0289 |
| 2019/0364492 | A1* | 11/2019 | Azizi | H04W 48/10 |

OTHER PUBLICATIONS

Ericsson (Rapporteur), "TP on QoS and new protocol layer", Tdoc R2-1700659, 3GPP TSG-RAN WG2 #AH, Spokane, Washington, USA, Agenda Item 3.2.1.2, Jan. 17-19, 2017, 3 pages.
Intel Corporation, "Remaining Issues on QoS", R2-1701717, (revision of R2-1700316), 3GPP TSG-RAN WG2 Meeting #97, Athens, Greece, Agenda Item: 10.2.1.3 QoS, Feb. 13-17, 2017, 4 pages.
Mediatek Inc., "On some open issues related to reflective QoS", R2-1703530, 3GPP TSG-RAN WG2 #97bis, Spokane, Washington, USA, Agenda Item 10.3.4.2, Apr. 3-7, 2017, 5 pages.
PCT/US2018/016635, International Search Report and Written Opinion, dated May 3, 2018, 14 pages.

* cited by examiner

QUALITY OF SERVICE FLOW TO DATA RADIO BEARER MAPPING OVERRIDE BIT

RELATED APPLICATIONS

This application is a non-provisional of U.S. Provisional Patent Application No. 62/454,675, filed Feb. 3, 2017, which is incorporated by reference herein in its entirety.

BACKGROUND

Various embodiments generally may relate to the field of wireless communications.

DETAILED DESCRIPTION OF PREFERRED EMBODIMENTS

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Fifth generation (5G) new radio (NR) uses a new quality of service (QoS) model, as compared to legacy cellular data communication systems. In the 5G system, data from different QoS flows is sent on data radio bearers (DRBs). The core network decides which DRB to send data of a QoS flow on in the uplink (UL) and in the downlink (DL). For the UL, the UE is told which DRB to send this data in. This is done by explicit RRC signaling or by reflective (implicit) mapping. Reflective mapping relies on UE monitoring the DL flows in a DRB and using it to decide that the UL flow should also go in the same DRB through which a packet associated with a given QoS flow is received.

When the mapping is explicitly signaled, it may sometimes be useful to temporarily change the QoS flow to DRB mapping to give some packets higher priority than others. This may be temporary, or may be applicable only for DL or UL traffic. Using radio resource control (RRC) signaling (explicit mapping) for this temporary mapping may not be effective because the mapping is temporary (explicit mapping may be better suited for more permanent mapping). Also, traffic communicated through a temporarily mapped DRB may contradict the mapping previously set up over RRC, resulting in confusion in the UE.

Disclosed herein is use of an override bit in the user plane (e.g., in a user plane packet) to indicate to the UE whether reflective mapping should take precedence over explicitly signaled mapping for the QoS flow corresponding to the user plane packet.

Figure 1:
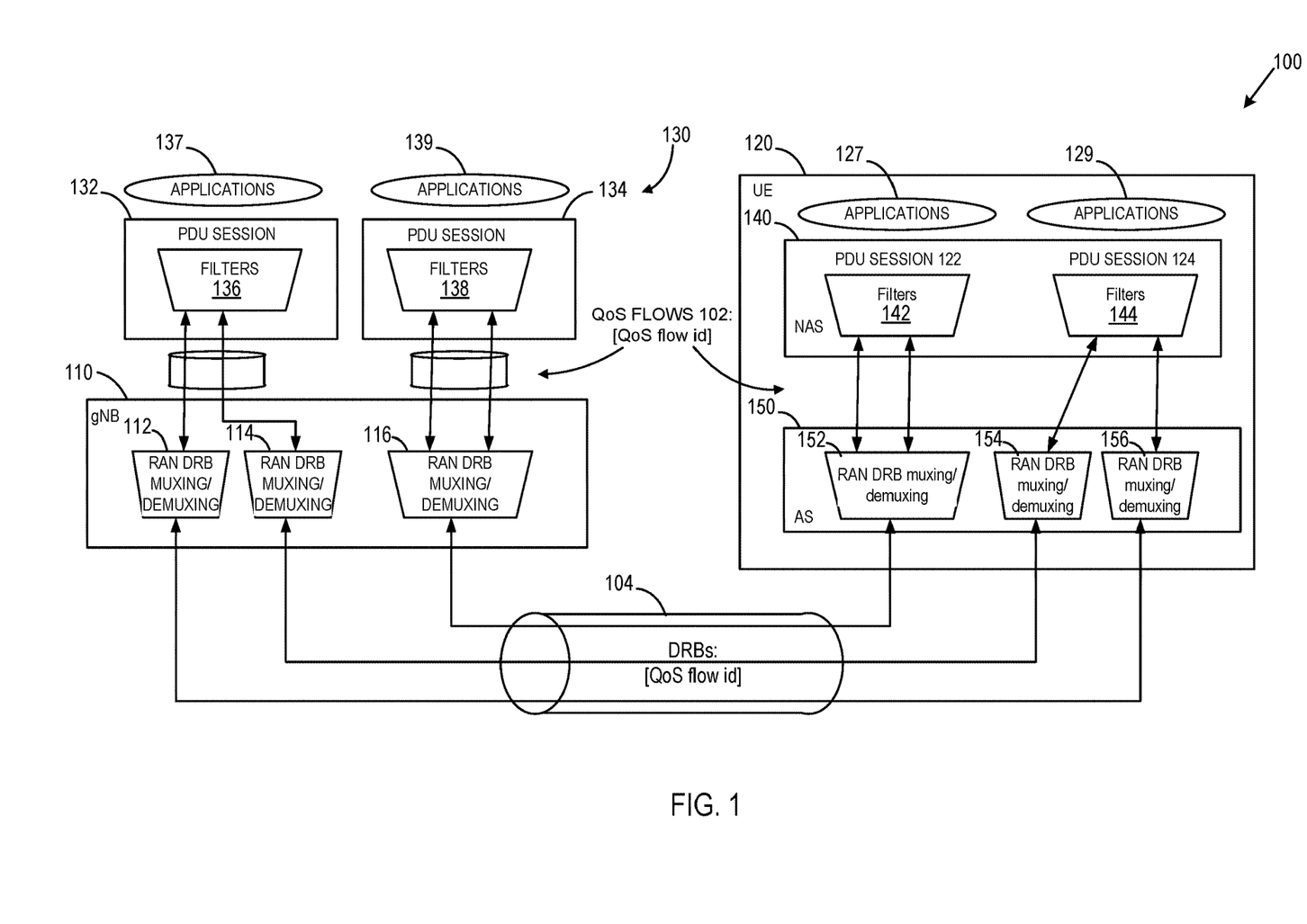
FIG. 1 is a simplified block diagram of a cellular data communication system, according to some embodiments.

FIG. 1 is a simplified block diagram of a cellular data communication system 100, according to some embodiments. The cellular data communication system 100 includes a next generation NodeB (gNB) 110 in communication with a core network (CN) 130 and a user equipment (UE) 120. The UE 120 includes applications 127, 129 corresponding to protocol data unit (PDU) sessions 122, 124 and filters 142, 144 of a non-access stratum (NAS) 140, and radio access network (RAN) DRB muxing/demuxing modules 152, 154, 156 of an access stratum (AS) 150. The gNB includes RAN DRB muxing/demuxing modules 112, 114, 116. The CN 130 includes applications 137, 139 corresponding to filters 136, 138 of PDU sessions 136, 138, respectively. QoS flows 102 having QoS flow ids are mapped to DRBs 104 for uplink (UL) and downlink (DL) communications.

The UE 120 has a mapping from a QoS flow 102 to a DRB 104. This mapping can be created either by reflective mapping or explicit configuration.

The UE 120 creates a reflective mapping if it finds a QoS flow marking in a user plane packet received in the DL from the gNB 110 in a DRB that was not associated with this QoS flow before. In contrast, mapping using explicit signaling is created by the gNB 110 providing this mapping information explicitly as part of the DRB configuration (e.g., in a radio resource control (RRC) message).

When a new QoS flow 102 for the UE 120 is identified by the gNB 110 (e.g., by explicit signaling from the CN 130 to the gNB 110 or by a new packet marker in a DL packet over an NG-U interface), the gNB 110 decides to assign the new QoS flow 102 to a DRB 104 and "communicates" the assignment to the UE either over the user plane (using reflective mapping) or by explicit signaling. This in itself does not result in a conflict of mapping between explicit signaling and the user plane, because for this case there is no existing QoS flow 102 to DRB mapping within the UE.

Even when the QoS marking is carried in the user plane for the explicit signaling case, there is no reason for the user plane marking and control plane signaling to be in conflict normally. That is, the gNB 110 should only send the packet in the DRB 104 that is configured explicitly.

The CN 130 can ensure that the reflective mapping and control plane signaling are not in conflict normally (with Exceptions 1-3 discussed below).

Exception 1: Change of Mapping of QoS Flow to Another Bearer

When a QoS flow mapping is changed from one DRB 104 to another DRB 104 by explicit signaling, there is a possibility that the data in transit can carry a different mapping in the user plane than that signaled. Since it is difficult to ensure synchronization between signaling and user data bearers, the UE 120 may receive a user plane marking corresponding to old mapping or new mapping before and after the explicit signaling. In this case, it may be reasonable to only use explicit signaling for the mapping and not the user plane. Thus, explicit signaling should take precedence for change of QoS flow mapping.

Exception 2: Change of Mapping Type from Reflective to Explicit

For the case where the mapping is changed from reflective to explicit, the explicit signaling can take precedence. For mapping the other way around, assuming that the explicit signaling configuration is released by use of explicit signaling, giving precedence to explicit signaling is still sufficient. Once the explicit signaling is released, the reflective mapping will be used and the correct mapping will apply (except possibly for a transient period). Thus, explicit signaling should take precedence for a change of QoS mapping between explicit and reflective mapping.

Exception 3: Temporary Change of Mapping

If for some reason the CN 130 wants to temporarily change the priority of a QoS flow 102, sending explicit signaling for this temporary change may be overkill and may go against the concept of flexible mapping. This can in fact be achieved by using reflected mapping and sending data down another DRB of the appropriate priority. This change of priority may apply only to DL data or DL and UL data. To apply the temporary change to UL data, reflective mapping must take precedence. Thus, reflective mapping should take precedence for a temporary change of priority (DRB) for a QoS flow.

From the above discussion, if all the above scenarios corresponding to Exceptions 1-3 are to be supported, both explicit and reflective mapping should take precedence for the different scenarios. The UE 120, however, may be unable to judge the scenario from simply looking at the QoS marking in the user plane. For example, when the UE 120 receives data on a DRB 104 different from a DRB 104 to which a QoS associated with the received data is mapped, the UE 120 does not know if it is a temporary change of priority or delayed data from a previous mapping.

One solution to get around this issue is to include an additional bit in the user plane to indicate whether the reflective mapping should apply or not. This bit can be used for the temporary change of prioritization of UL and DL traffic.

Embodiments herein may then use an override bit in the user plane to indicate to the UE 120 whether reflective mapping should take precedence over explicit signaling for the QoS flow corresponding to this packet bit.

By way of non-limiting example, the UE 120 may have two established DRBs 104 (DRB1 and DRB2). Assume that QoS Flow X has been associated with DRB1 using explicit RRC signaling.

In some scenarios (e.g., DL-only congestion) the RAN decides to temporarily reroute the DL packets of QoS Flow X onto DRB2, while keeping the UL packets of QoS Flow X on DRB1. This is achieved by setting the override bit in the DL packets to "0" (meaning "use explicitly signaled DRB mapping for UL packets").

In some other scenarios (e.g., DL and UL congestion) the RAN decides to temporarily reroute both DL and UL packets of QoS Flow X onto DRB2. This is achieved by setting the override bit in the DL packets to "1" (meaning "use reflective mapping for UL packets").

One example where this override bit could be useful includes situations where it may be useful to temporarily send transmission control protocol acknowledgments (TCP ACKs) or certain video frames with a higher priority on the DL to the UE without changing the priority of the corresponding QoS flow mapping in the UL.

In certain cases, the network may need to send a dummy packet to the UE to change the priority for the UL if there is no DL packet to send to carry the QoS flow marker and override bit. These dummy packets can also be used to temporarily change the priority for the UL packets while continuing to send the DL packets on the original DRB with the original priority. In some embodiments, these dummy packets may not include data in their payload.

Figure 2:
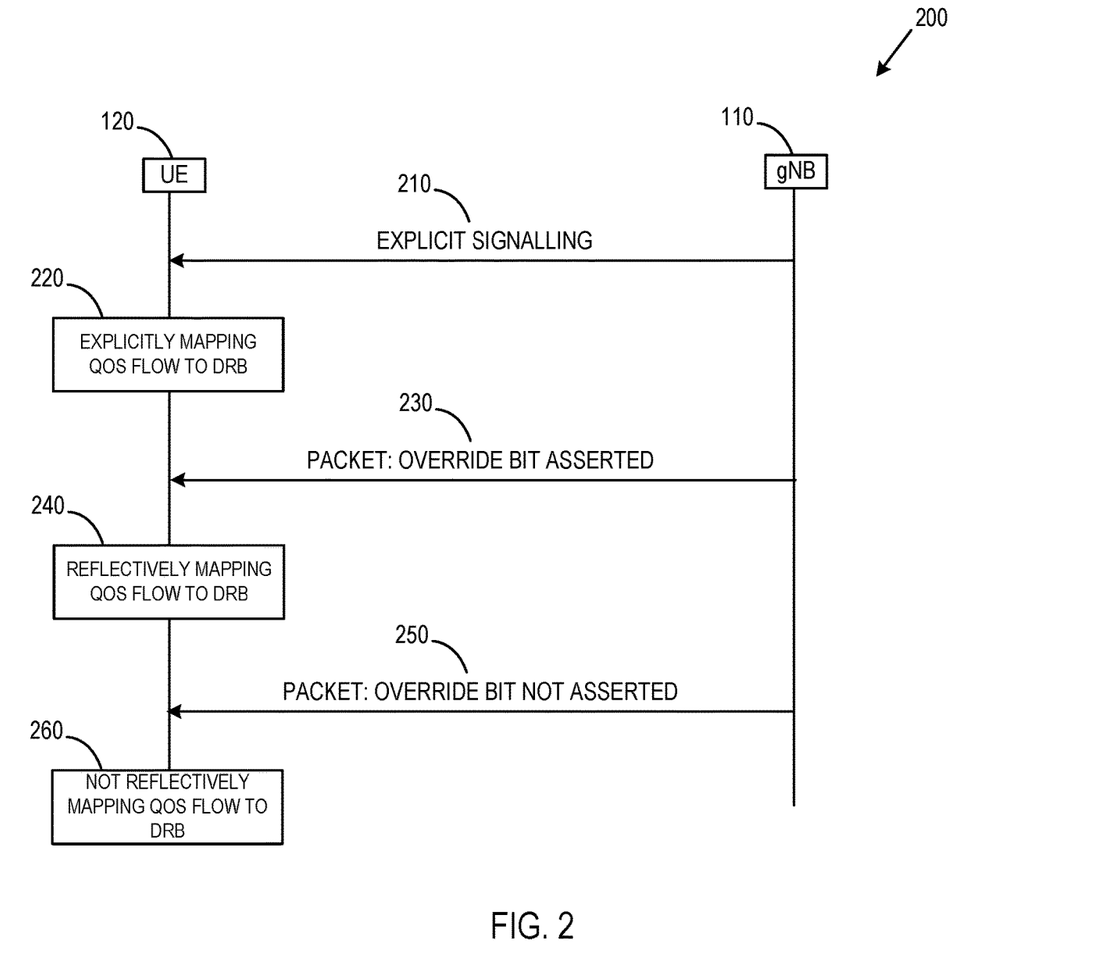
FIG. 2 is a simplified signal flow diagram illustrating a method of mapping a quality of service (QoS) flow to a data radio bearer (DRB), according to some embodiments.

FIG. 2 is a simplified signal flow diagram illustrating a method 200 of mapping a QoS flow to a DRB, according to some embodiments. The method 200 includes explicitly signaling 210 the mapping of the QoS flow to the DRB. In some embodiments, explicitly signaling 210 the mapping of the QoS flow to the DRB may include transmitting, by a gNB 110, a message to a UE 120, the message including data explicitly indicating that the UE 120 should map the QoS flow to the DRB. By way of non-limiting example, the message may include an RRC message. In some instances, explicitly signaling 210 the mapping may be for an initial mapping, or for a subsequent change in the mapping. The method 200 also includes explicitly mapping 220, by the UE 120, the QoS flow to the DRB in the UL responsive to the explicit signaling 210.

The method 200 further includes transmitting, by the gNB 110 to the UE 120, a packet 230 (e.g., a user plane packet) including an override bit that is asserted to indicate that the UE 120 should use reflective mapping for the UL. The packet 230 may correspond to the QoS flow (e.g., marked with a QoS flow id of the QoS flow), but may be transmitted to the UE 120 in the DL through a DRB that is not mapped to the QoS flow. In this way, the gNB 110 may indicate to the UE reflectively that the QoS flow should be mapped to the DRB. In some embodiments, this mapping may be for an initial mapping, or for a subsequent change in the mapping. The method 200 also includes reflectively mapping 240, by the UE 120, the QoS flow to the DRB in the UL responsive to the packet 230.

The method 200 further includes transmitting, by the gNB 110 to the UE 120, a packet 230 (e.g., a user plane packet) including an override bit that is not asserted to indicate that the UE 120 should not use reflective mapping for the UL. The packet 230 may correspond to the QoS flow (e.g., marked with a QoS flow id of the QoS flow), but may be transmitted to the UE 120 in the DL through a DRB that is not mapped to the QoS flow. In this way, the gNB 110 may change the DRB used to transmit data in the DL without changing the mapping of the QoS corresponding thereto in the UL. The method 200 also includes not reflectively mapping 260, by the UE 120, the QoS flow to the DRB in the UL responsive to the packet 250.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 3:
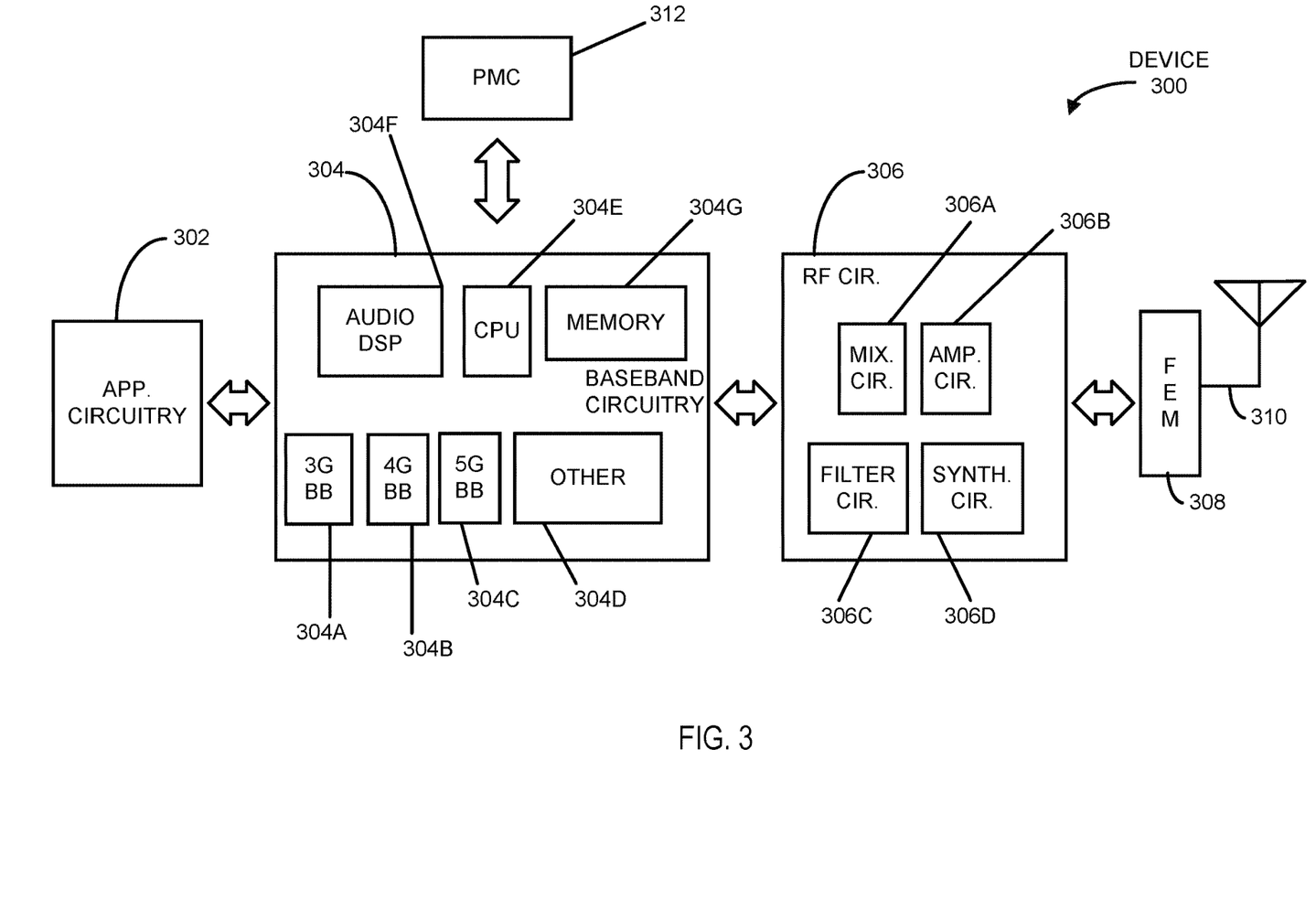
FIG. 3 illustrates, for one embodiment, example components of an electronic device in accordance with some embodiments.

Embodiments described herein may be implemented into a system using any suitably configured hardware and/or software. FIG. 3 illustrates, for one embodiment, example components of an electronic device 300 in accordance with some embodiments. In some embodiments, the electronic device 300 may be, implement, be incorporated into, or otherwise be a part of a user equipment (UE), an evolved NodeB (eNB), and/or some other electronic device. In some embodiments, the electronic device 300 may include application circuitry 302, baseband circuitry 304, Radio Frequency (RF) circuitry 306, front-end module (FEM) circuitry 308, one or more antennas 310, and power management circuitry (PMC) 312 coupled together at least as shown. The components of the illustrated device 300 may be included in a UE or a RAN node. In some embodiments where the electronic device 300 is implemented in or by an eNB or gNB, the electronic device 300 may also include network interface circuitry (not shown) for communicating over a wired interface (for example an X2 interface, an S1 interface, and the like). In some embodiments, the device 300 may include fewer elements (e.g., a RAN node may not utilize application circuitry 302, and instead include a processor/controller to process IP data received from an EPC). In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include computer-readable media (also referred to as "CRM," "memory," "storage," or "memory/storage") and may be configured to execute instructions stored in the memory/storage to enable various applications and/or operating systems to run on the device 300. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors or control logic to process baseband signals received from a receive signal path of the RF circuitry 306 and to generate baseband signals for a transmit signal path of the RF circuitry 306. Baseband circuitry 304 may interface with the application circuitry 302 for generation and processing of the baseband signals and for controlling operations of the RF circuitry 306. For example, in some embodiments, the baseband circuitry 304 may include a third generation (3G) baseband processor 304A, a fourth generation (4G) baseband processor 304B, a fifth generation (5G) baseband processor 304C, or other baseband processor(s) 304D for other existing generations, generations in development or generations to be developed in the future (e.g., second generation (2G), sixth generation (6G), etc.). The baseband circuitry 304 (e.g., one or more of baseband processors 304A-D) may handle various radio control functions that enable communication with one or more radio networks via the RF circuitry 306. In other embodiments, some or all of the functionality of baseband processors 304A-D may be included in modules stored in the memory 304G and executed via a Central Processing Unit (CPU) 304E. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), precoding, or constellation mapping/demapping functionality. In some embodiments, encoding/decoding circuitry of the baseband circuitry 304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include elements of a protocol stack such as, for example, elements of an evolved universal terrestrial radio access network (EUTRAN) protocol including, for example, physical (PHY), media access control (MAC), radio link control (RLC), package data convergence protocol (PDCP), and/or radio resource control (RRC) elements. A central processing unit (CPU) 304E of the baseband circuitry 304 may be configured to run elements of the protocol stack for signaling of the PHY, MAC, RLC, PDCP and/or RRC layers. In some embodiments, the baseband circuitry 304 may include one or more audio digital signal processor(s) (DSP) 304F. The audio DSP(s) 304F may include elements for compression/decompression and echo cancellation and may include other suitable processing elements in other embodiments. The baseband circuitry 304 may further include computer-readable media (also referred to as "CRM," "memory," "storage," or "memory/storage"). The CRM may be used to load and store data and/or instructions for operations performed by the processors of the baseband circuitry 304. CRM for one embodiment may include any combination of suitable volatile memory and/or non-volatile memory. The CRM may include any combination of various levels of memory/storage including, but not limited to, read-only memory (ROM) having embedded software instructions (e.g., firmware), random access memory (e.g., dynamic random access memory (DRAM)), cache, buffers, etc. The CRM may be shared among the various processors or dedicated to particular processors. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. The RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306A, amplifier circuitry 306B and filter circuitry 306C. In some embodiments, the transmit signal path of the RF circuitry 306 may include filter circuitry 306C and mixer circuitry 306A. RF circuitry 306 may also include synthesizer circuitry 306D for synthesizing a frequency for use by the mixer circuitry 306A of the receive signal path and the transmit signal path. In some embodiments, the mixer circuitry 306A of the receive signal path may be configured to down-convert RF signals received from the FEM circuitry 308 based on the synthesized frequency provided by synthesizer circuitry 306D. The amplifier circuitry 306B may be configured to amplify the down-converted signals and the filter circuitry 306C may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, the mixer circuitry 306A of the receive signal path may comprise passive mixers, although the scope of the embodiments is not limited in this respect.

In some embodiments, the mixer circuitry 306A of the transmit signal path may be configured to up-convert input baseband signals based on the synthesized frequency provided by the synthesizer circuitry 306D to generate RF output signals for the FEM circuitry 308. The baseband signals may be provided by the baseband circuitry 304 and may be filtered by the filter circuitry 306C. The filter circuitry 306C may include a low pass filter (LPF), although the scope of the embodiments is not limited in this respect.

In some embodiments, the mixer circuitry 306A of the receive signal path and the mixer circuitry 306A of the transmit signal path may include two or more mixers and may be arranged for quadrature downconversion and upconversion, respectively. In some embodiments, the mixer circuitry 306A of the receive signal path and the mixer circuitry 306A of the transmit signal path may include two or more mixers and may be arranged for image rejection (e.g., Hartley image rejection). In some embodiments, the mixer circuitry 306A of the receive signal path and the mixer circuitry 306A of the transmit signal path may be arranged for direct downconversion and direct upconversion, respectively. In some embodiments, the mixer circuitry 306A of the receive signal path and the mixer circuitry 306A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306D may be a fractional-N synthesizer or a fractional N/N+1 synthesizer, although the scope of the embodiments is not limited in this respect as other types of frequency synthesizers may be suitable. For example, synthesizer circuitry 306D may be a delta-sigma synthesizer, a frequency multiplier, or a synthesizer comprising a phase-locked loop with a frequency divider.

The synthesizer circuitry 306D may be configured to synthesize an output frequency for use by the mixer circuitry 306A of the RF circuitry 306 based on a frequency input and a divider control input. In some embodiments, the synthesizer circuitry 306D may be a fractional N/N+1 synthesizer.

In some embodiments, frequency input may be provided by a voltage controlled oscillator (VCO), although that is not a requirement. Divider control input may be provided by either the baseband circuitry 304 or the application circuitry 302 (such as an applications processor) depending on the desired output frequency. In some embodiments, a divider control input (e.g., N) may be determined from a look-up table based on a channel indicated by the application circuitry 302.

Synthesizer circuitry 306D of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 306D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path which may include circuitry configured to operate on RF signals received from one or more antennas 310, amplify the received signals, and provide the amplified versions of the received signals to the RF circuitry 306 for further processing. The FEM circuitry 308 may also include a transmit signal path which may include circuitry configured to amplify signals for transmission provided by the RF circuitry 306 for transmission by one or more of the one or more antennas 310. In various embodiments, the amplification through the transmit or receive signal paths may be done solely in the RF circuitry 306, solely in the FEM circuitry 308, or in both the RF circuitry 306 and the FEM circuitry 308.

In some embodiments, the FEM circuitry 308 may include a TX/RX switch to switch between transmit mode and receive mode operation. The FEM circuitry 308 may include a receive signal path and a transmit signal path. The receive signal path of the FEM circuitry 308 may include a Low Noise Amplifier (LNA) to amplify received RF signals and provide the amplified received RF signals as an output (e.g., to the RF circuitry 306). The transmit signal path of the FEM circuitry 308 may include a power amplifier (PA) to amplify input RF signals (e.g., provided by the RF circuitry 306), and one or more filters to generate RF signals for subsequent transmission (e.g., by one or more of the one or more antennas 310).

In some embodiments, the PMC 312 may manage power provided to the baseband circuitry 304. In particular, the PMC 312 may control power-source selection, voltage scaling, battery charging, or DC-to-DC conversion. The PMC 312 may often be included when the device 300 is capable of being powered by a battery, for example, when the device 300 is included in a UE. The PMC 312 may increase the power conversion efficiency while providing desirable implementation size and heat dissipation characteristics.

FIG. 3 shows the PMC 312 coupled only with the baseband circuitry 304. However, in other embodiments, the PMC 312 may be additionally or alternatively coupled with, and perform similar power management operations for, other components such as, but not limited to, the application circuitry 302, the RF circuitry 306, or the FEM circuitry 308.

In some embodiments, the PMC 312 may control, or otherwise be part of, various power saving mechanisms of the device 300. For example, if the device 300 is in an RRC_Connected state, where it is still connected to the RAN node as it expects to receive traffic shortly, then it may enter a state known as Discontinuous Reception Mode (DRX) after a period of inactivity. During this state, the device 300 may power down for brief intervals of time and thus save power.

If there is no data traffic activity for an extended period of time, then the device 300 may transition off to an RRC_Idle state, where it disconnects from the network and does not perform operations such as channel quality feedback, handover, etc. The device 300 goes into a very low power state and it performs paging where again it periodically wakes up to listen to the network and then powers down again. The device 300 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 302 and processors of the baseband circuitry 304 may be used to execute elements of one or more instances of a protocol stack. For example, processors of the baseband circuitry 304, alone or in combination, may be used to execute Layer 3, Layer 2, or Layer 1 functionality, while processors of the application circuitry 302 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 4:
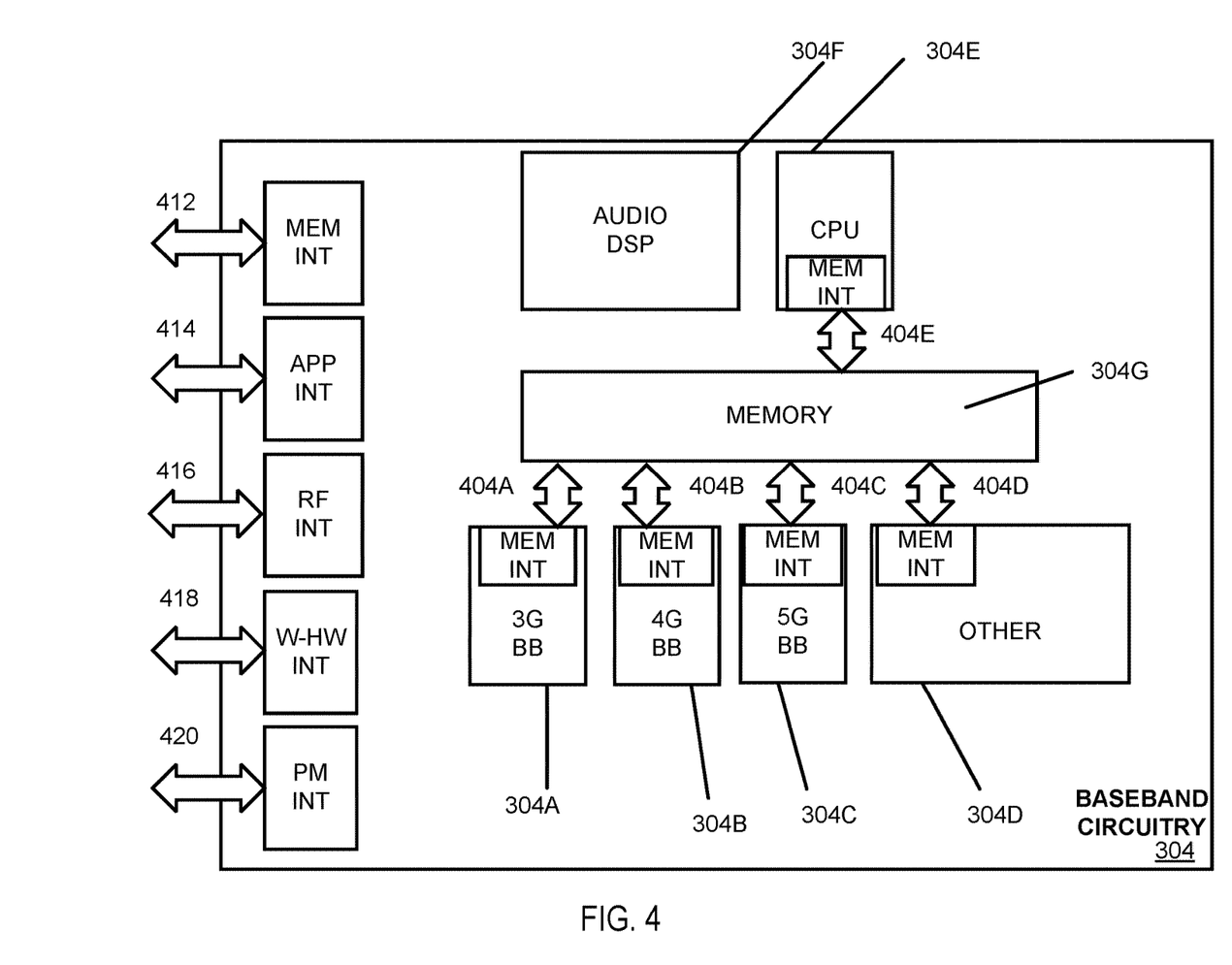
FIG. 4 illustrates example interfaces of baseband circuitry in accordance with some embodiments.

FIG. 4 illustrates example interfaces of baseband circuitry in accordance with some embodiments. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), a wireless hardware connectivity interface 418 (e.g., an interface to send/receive data to/from Near Field Communication (NFC) components, Bluetooth® components (e.g., Bluetooth® Low Energy), Wi-Fi® components, and other communication components), and a power management interface 420 (e.g., an interface to send/receive power or control signals to/from the PMC 312).

Figure 5:
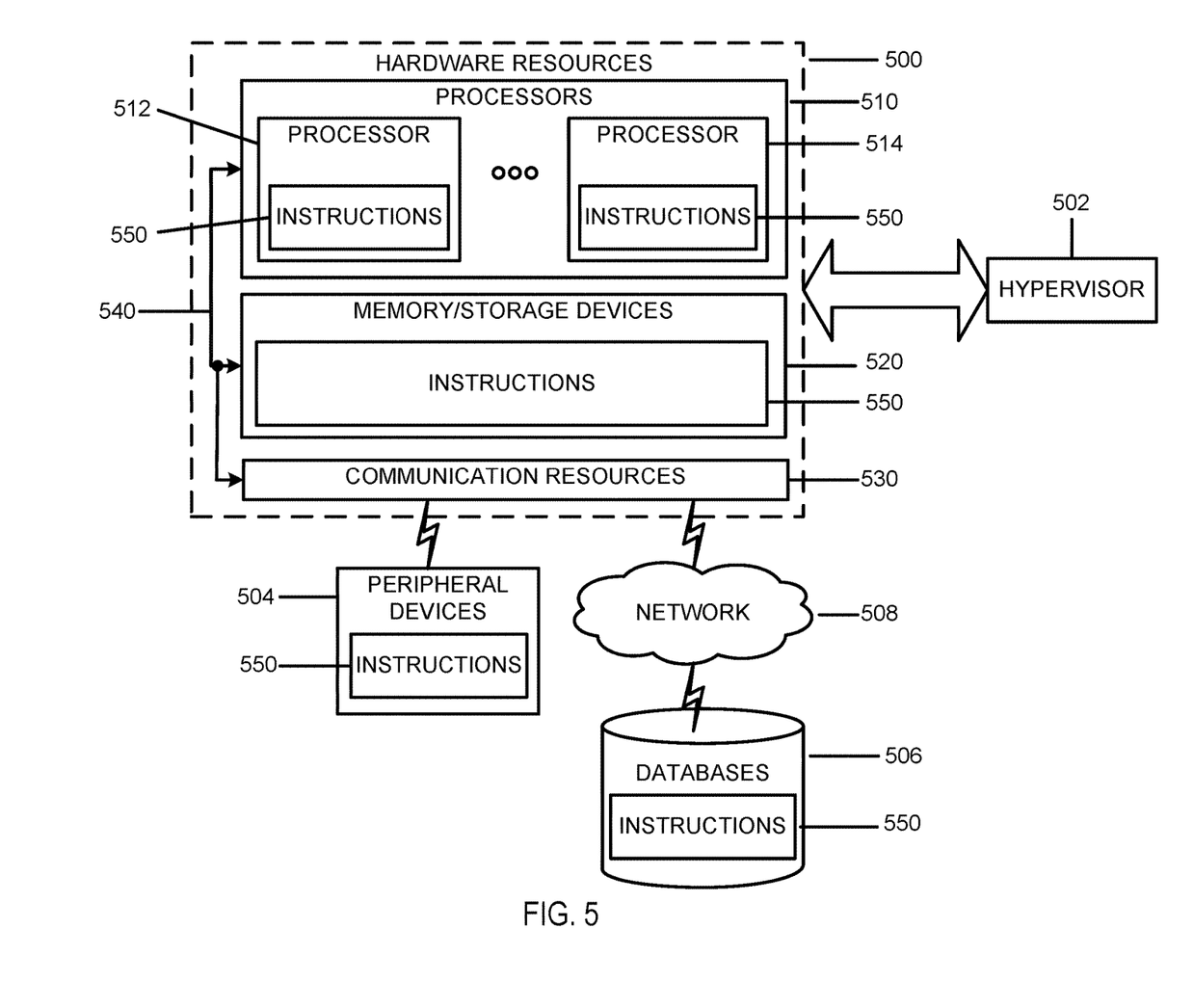
FIG. 5 is a block diagram illustrating components, according to some example embodiments.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500.

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 512 and a processor 514.

The memory/storage devices 520 may include main memory, disk storage, or any suitable combination thereof. The memory/storage devices 520 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

Figure 6:
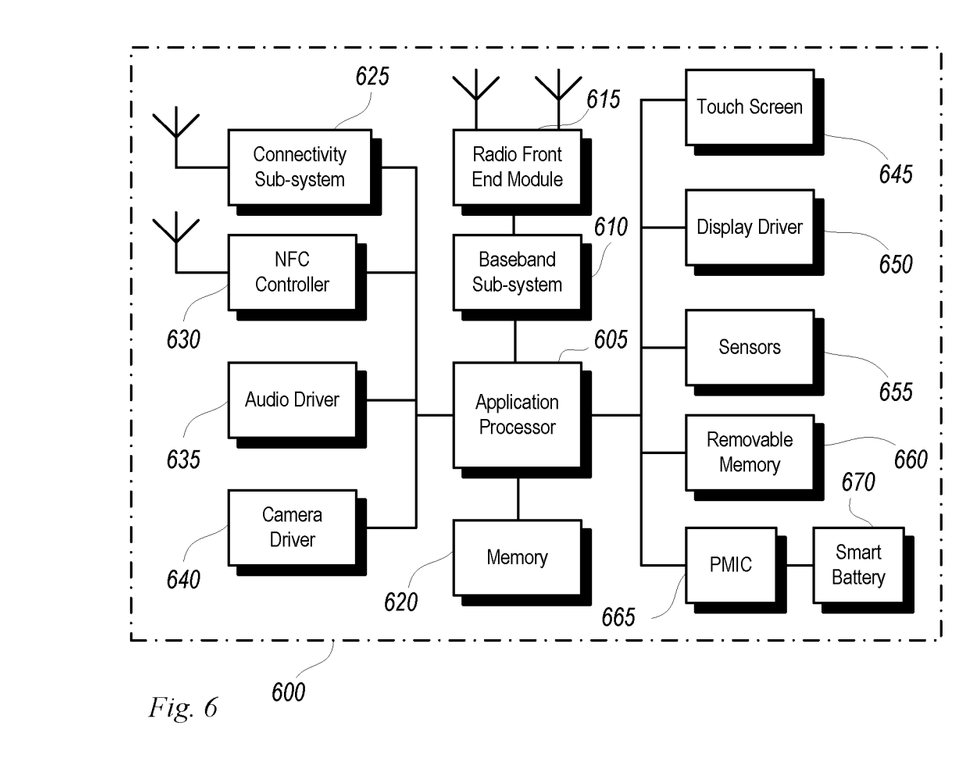
FIG. 6 illustrates a user device in accordance with an aspect.

FIG. 6 illustrates a user device 600 in accordance with an aspect. The user device 600 may be a mobile device in some aspects and includes an application processor 605, baseband processor 610 (also referred to as a baseband sub-system), radio front end module (RFEM) 615, memory 620, connectivity sub-system 625, near field communication (NFC) controller 630, audio driver 635, camera driver 640, touch screen 645, display driver 650, sensors 655, removable memory 660, power management integrated circuit (PMIC) 665 and smart battery 670.

In some aspects, application processor 605 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 610 may be implemented, for example, as a solder-down substrate including one or more integrated circuits, a single packaged integrated circuit soldered to a main circuit board, and/or a multi-chip module containing two or more integrated circuits.

Figure 7:
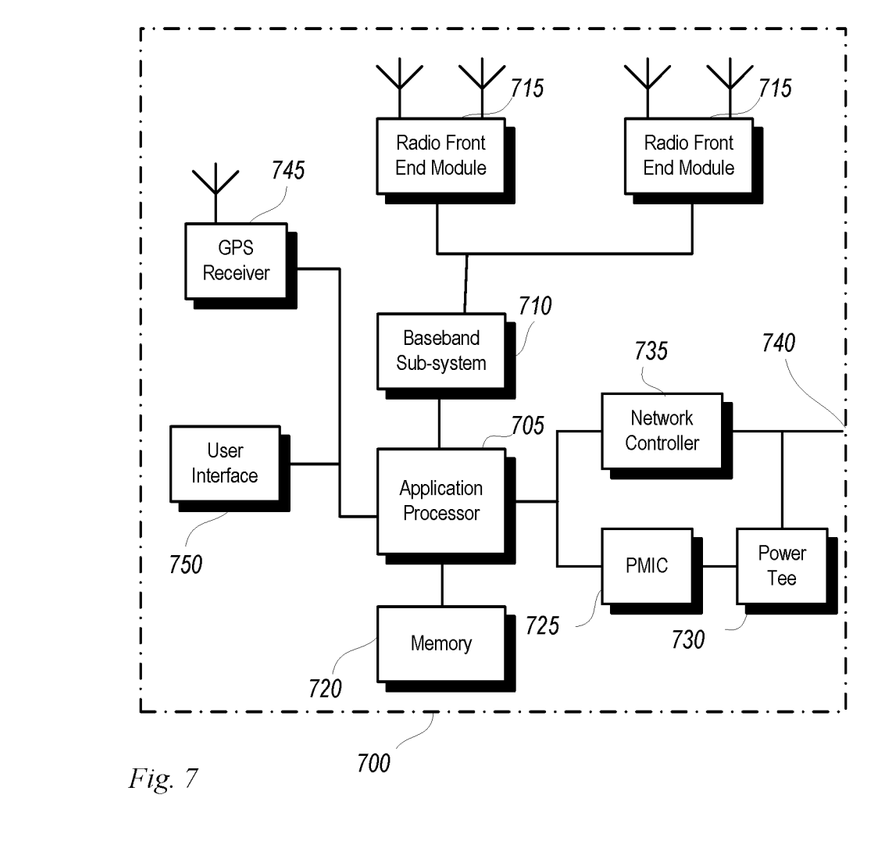
FIG. 7 illustrates a base station or infrastructure equipment radio head in accordance with an aspect.

FIG. 7 illustrates a base station or infrastructure equipment radio head 700 in accordance with an aspect. The base station radio head 700 may include one or more of application processor 705, baseband processor 710, one or more radio front end modules 715, memory 720, power management circuitry 725, power tee circuitry 730, network controller 735, network interface connector 740, satellite navigation receiver 745, and user interface 750.

In some aspects, application processor 705 may include one or more CPU cores and one or more of cache memory, low drop-out voltage regulators (LDOs), interrupt controllers, serial interfaces such as SPI, I2C or universal programmable serial interface, real time clock (RTC), timer-counters including interval and watchdog timers, general purpose 10, memory card controllers such as SD/MMC or similar, USB interfaces, MIPI interfaces and Joint Test Access Group (JTAG) test access ports.

In some aspects, baseband processor 710 may be implemented, for example, as a solder-down substrate including one or more integrated circuits, a single packaged integrated circuit soldered to a main circuit board or a multi-chip module containing two or more integrated circuits.

In some aspects, memory 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 720 may be implemented as one or more of solder down packaged integrated circuits, socketed memory modules and plug-in memory cards.

In some aspects, power management integrated circuitry 725 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 730 may provide for electrical power drawn from a network cable to provide both power supply and data connectivity to the base station radio head 700 using a single cable.

In some aspects, network controller 735 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 745 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 745 may provide data to application processor 705 which may include one or more of position data or time data. Application processor 705 may use time data to synchronize operations with other radio base stations.

In some aspects, user interface 750 may include one or more of physical or virtual buttons, such as a reset button, one or more indicators such as light emitting diodes (LEDs) and a display screen.

In some embodiments, the devices 110, 120, 130, 300, 304, 500, 600, 700 of FIGS. 1-7 may be configured to perform one or more processes, techniques, and/or methods as described herein, or portions thereof.

EXAMPLES

The following is a non-exhaustive list of example embodiments that fall within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below, and the above disclosed embodiments, are not combinable, it is contemplated within the scope of the disclosure that such examples and embodiments are combinable.

Example 1: An apparatus of a user equipment (UE), comprising: one or more data storage devices configured to store data corresponding to mapping of QoS flows to data radio bearers; and one or more processors operably coupled to the one or more data storage devices, the one or more processors configured to: map one or more quality of service (QoS) flows to a data radio bearer (DRB) in an uplink (UL) responsive to receipt, by the UE from a cellular base station, of a user plane packet in a downlink (DL) through the DRB if an override bit of the user plane packet indicates that reflective mapping should apply; and not map the one or more QoS flows to the DRB in the UL if the override bit of the user plane packet indicates that the UE should ignore the reflective mapping.

Example 2: The apparatus of Example 1, wherein the one or more processors are configured to map the one or more QoS flows to the DRB by switching from the one or more QoS flows being previously mapped to another DRB to the one or more QoS flows being mapped to the DRB responsive to the user plane packet.

Example 3: The apparatus according to any one of Examples 1 and 2, wherein the one or more processors are configured to map the one or more QoS flows to any of a plurality of different DRBs in the UL responsive to explicit instructions received from the cellular base station.

Example 4: The apparatus of Example 3, wherein the explicit instructions are received in a Radio Resource Control (RRC) signal from the cellular base station.

Example 5: The apparatus according to any one of Examples 3 and 4, wherein the one or more processors are configured to perform an initial mapping of the one or more QoS flows to one of the plurality of different DRBs in the UL responsive to the explicit instructions received from the cellular base station.

Example 6: The apparatus according to any one of Examples 1-5, wherein the one or more processors are configured to perform an initial mapping of the one or more QoS flows to one of a plurality of different DRBs in the UL responsive to receipt of an initial user plane packet in the DL through the one or more QoS flows if the override bit of the user plane packet indicates that the reflective mapping should apply.

Example 7: The apparatus according to any one of Examples 1-6, wherein the user plane packet includes a reflective mapping packet that is transmitted to the UE for the purpose of reflective mapping rather than for the purpose of transmitting data in a payload of the reflective mapping packet.

Example 8: The apparatus according to any one of Examples 1-7, wherein the one or more processors are configured to switch from using explicit mapping to using reflective mapping responsive to the override bit indicating that reflective mapping should apply.

Example 9: The apparatus according to any one of Examples 1-8, wherein the one or more processors are configured to switch from using reflective mapping to using explicit mapping responsive to the override bit indicating that the UE should ignore the reflective mapping.

Example 10: The apparatus according to any one of Examples 1-9, wherein the user plane packet includes data corresponding to a transmission control protocol (TCP) acknowledgment (ACK).

Example 11: The apparatus according to any one of claims 1-10, wherein the user plane packet includes data corresponding to one or more video frames.

Example 12: The apparatus according to any one of claims 1-9, wherein the user plane packet includes a dummy packet transmitted by the RAN node.

Example 13: An apparatus of a user equipment (UE), comprising: a cellular radio configured to receive, from a radio access network (RAN) node of a cellular data network, a user plane packet through a first data radio bearer (DRB), the user plane packet corresponding to a QoS flow, the user plane packet including an override bit configured to indicate whether reflective mapping of the QoS flow to the first DRB should take precedence over explicit mapping for the QoS flow; and one or more processors operably coupled to the cellular radio, the one or more processors configured to: map the QoS flow to the first DRB in an uplink (UL) if the override bit indicates that the reflective mapping of the QoS flow to the first DRB should take precedence over the explicit mapping; and not map the QoS flow to the first DRB in the UL if the override bit indicates that the reflective mapping of the QoS flow to the first DRB should not take precedence over the explicit mapping.

Example 14: The apparatus of Example 13, wherein the one or more processors are configured to map the QoS flow to a second DRB in the UL if the cellular radio receives explicit signaling from the RAN node that indicates that the QoS flow should be mapped to the second DRB in the UL and the override bit of the user plane packet indicates that the reflective mapping of the QoS flow to the first DRB should not take precedence over the explicit signaling.

Example 15: The apparatus according to any one of Examples 13 and 14, wherein the one or more processors are configured to switch an explicit mapping of the QoS flow to a second DRB to a reflective mapping of the QoS flow to the first DRB responsive to the user plane packet if the override bit indicates that the reflective mapping of the QoS flow to the first DRB should take precedence over the explicit mapping.

Example 16: The apparatus according to any one of Examples 13-15, wherein the one or more processors are configured to maintain an explicit mapping of the QoS flow to a second DRB responsive to the user plane packet if the override bit indicates that the reflective mapping of the QoS flow to the first DRB should not take precedence over the explicit mapping.

Example 17: The apparatus of Example 16, wherein the user plane packet includes data corresponding to a transmission control protocol (TCP) acknowledgment (ACK).

Example 18: The apparatus of Example 16, wherein the user plane packet includes data corresponding to one or more video frames.

Example 19: The apparatus according to any one of Examples 10-16, wherein the user plane packet includes a dummy packet transmitted by the RAN node.

Example 20: An apparatus of a radio access network (RAN) node, comprising: one or more data storage devices configured to store data corresponding to mapping of quality of service (QoS) flows to data radio bearers (DRBs); and one or more processors configured to encode a user plane packet corresponding to a QoS flow to be transmitted to a user equipment (UE) through a DRB, the user plane packet including an override bit, the override bit configured to indicate to the UE whether reflective mapping of the QoS flow to the DRB in an uplink (UL) should take precedence over explicit mapping of the QoS flow to one of the DRBs.

Example 21: The apparatus of Example 20, wherein the user plane packet includes data corresponding to a transmission control protocol (TCP) acknowledgment (ACK).

Example 22: The apparatus of Example 20, wherein the user plane packet includes data corresponding to one or more video frames.

Example 23: The apparatus of Example 20, wherein the user plane packet comprises a dummy packet configured to instruct the UE regarding reflective mapping rather than deliver a data payload to the UE.

Example 24: The apparatus according to any one of Examples 20-23, wherein the one or more processors are configured to encode a radio resource control (RRC) message to be transmitted to the UE, the RRC message configured to explicitly indicate mapping of the QoS flows to the DRBs in the UL.

Example 25 may include the NR or LTE RAN using NG core based QoS model, where QoS flow to DRB mapping is controlled by the network; and this is done by explicit RRC signalling and/or reflective mapping; and network wants to change the priority of the QoS flow and send data over a different DRB; and network controlling what priority or DRB UE uses for the corresponding UL traffic by setting an override bit in the user plane packet Example 26 as per example 25 and/or some other example herein, and the override bit indicating to the UE that the UE should use this DRB for UL traffic and ignore the RRC configured one Example 27 as per example 25 and/or some other example herein, and the override bit indicating to the UE to ignore the DRB used for this flow and use the RRC configured one Example 28 as per any of the above examples and or some other example herein, and the network using a dummy packet to carry the QoS flow and the override bit.

Example 29 may include the UE and network equipment examples for the above.

Example 30 may include an apparatus comprising means to perform one or more elements of a method described in or related to any of examples 1-29, or any other method or process described herein.

Example 31 may include one or more non-transitory computer-readable media comprising instructions to cause an electronic device, upon execution of the instructions by one or more processors of the electronic device, to perform one or more elements of a method described in or related to any of examples 1-29, or any other method or process described herein.

Example 32 may include an apparatus comprising logic, modules, and/or circuitry to perform one or more elements of a method described in or related to any of examples 1-29, or any other method or process described herein.

Example 33 may include a method, technique, or process as described in or related to any of examples 1-29, or portions or parts thereof.

Example 34 may include an apparatus comprising: one or more processors and one or more computer readable media comprising instructions that, when executed by the one or more processors, cause the one or more processors to perform the method, techniques, or process as described in or related to any of examples 1-29, or portions thereof.

Example 35 may include a method of communicating in a wireless network as shown and described herein.

Example 36 may include a system for providing wireless communication as shown and described herein.

Example 37 may include a device for providing wireless communication as shown and described herein.

CONCLUSION

It will be apparent to those having skill in the art that many changes may be made to the details of the above-described embodiments without departing from the underlying principles of the disclosure. The scope of the present disclosure should, therefore, be determined only by the following claims.

The invention claimed is:

1. An apparatus of a user equipment (UE), comprising:
one or more data storage devices configured to store data corresponding to mapping of QoS flows to data radio bearers; and
one or more processors operably coupled to the one or more data storage devices, the one or more processors configured to:
map one or more quality of service (QoS) flows to a data radio bearer (DRB) in an uplink (UL) responsive to receipt, by the UE from a cellular base station, of a user plane packet associated with the one or more QoS flows in a downlink (DL) through the DRB if an override bit of the user plane packet indicates that reflective mapping, wherein the UE is to use a same DRB for the one or more QoS flows in the UL as was used to receive the user plane packet associated with the one or more QoS flows in the DL, should apply; and
not map the one or more QoS flows to the DRB in the UL if the override bit of the user plane packet indicates that the UE should ignore the reflective mapping.

2. The apparatus of claim 1, wherein the one or more processors are configured to map the one or more QoS flows to the DRB by switching from the one or more QoS flows being previously mapped to another DRB to the one or more QoS flows being mapped to the DRB responsive to the user plane packet.

3. The apparatus of claim 1, wherein the one or more processors are configured to map the one or more QoS flows to any of a plurality of different DRBs in the UL responsive to explicit instructions received from the cellular base station.

4. The apparatus of claim 3, wherein the explicit instructions are received in a Radio Resource Control (RRC) signal from the cellular base station.

5. The apparatus of claim 3, wherein the one or more processors are configured to perform an initial mapping of the one or more QoS flows to one of the plurality of different DRBs in the UL responsive to the explicit instructions received from the cellular base station.

6. The apparatus of claim 1, wherein the one or more processors are configured to perform an initial mapping of the one or more QoS flows to one of a plurality of different DRBs in the UL responsive to receipt of an initial user plane packet in the DL through the one or more QoS flows if the override bit of the user plane packet indicates that the reflective mapping should apply.

7. The apparatus of claim 1, wherein the user plane packet includes a reflective mapping packet that is transmitted to the UE for the purpose of reflective mapping rather than for the purpose of transmitting data in a payload of the reflective mapping packet.

8. The apparatus of claim 1, wherein the one or more processors are configured to switch from using explicit mapping to using reflective mapping responsive to the override bit indicating that reflective mapping should apply.

9. The apparatus of claim 1, wherein the one or more processors are configured to switch from using reflective mapping to using explicit mapping responsive to the override bit indicating that the UE should ignore the reflective mapping.

10. The apparatus of claim 1, wherein the user plane packet includes data corresponding to a transmission control protocol (TCP) acknowledgment (ACK).

11. The apparatus of claim 1, wherein the user plane packet includes data corresponding to one or more video frames.

12. The apparatus of claim 1, wherein the user plane packet includes a dummy packet transmitted by the RAN node.

13. An apparatus of a user equipment (UE), comprising:
a cellular radio configured to receive, from a radio access network (RAN) node of a cellular data network, in a downlink (DL), a user plane packet through a first data radio bearer (DRB), the user plane packet corresponding to a QoS flow, the user plane packet including an override bit configured to indicate whether reflective mapping, wherein the UE is to use a same DRB for the QoS flow in an uplink (UL) as is used to receive the user plane packet corresponding to the QoS flow in the DL, should take precedence over explicit mapping for the QoS flow; and one or more processors operably coupled to the cellular radio, the one or more processors configured to:

map the QoS flow to the first DRB in the UL if the override bit indicates that the reflective mapping of the QoS flow to the first DRB should take precedence over the explicit mapping; and not map the QoS flow to the first DRB in the UL if the override bit indicates that the reflective mapping of the QoS flow to the first DRB should not take precedence over the explicit mapping.

14. The apparatus of claim 13, wherein the one or more processors are configured to map the QoS flow to a second DRB in the UL if the cellular radio receives explicit signaling from the RAN node that indicates that the QoS flow should be mapped to the second DRB in the UL and the override bit of the user plane packet indicates that the reflective mapping of the QoS flow to the first DRB should not take precedence over the explicit signaling.

15. The apparatus of claim 13, wherein the one or more processors are configured to switch an explicit mapping of the QoS flow to a second DRB to a reflective mapping of the QoS flow to the first DRB responsive to the user plane packet if the override bit indicates that the reflective mapping of the QoS flow to the first DRB should take precedence over the explicit mapping.

16. The apparatus of claim 13, wherein the one or more processors are configured to maintain an explicit mapping of the QoS flow to a second DRB responsive to the user plane packet if the override bit indicates that the reflective mapping of the QoS flow to the first DRB should not take precedence over the explicit mapping.

17. The apparatus of claim 16, wherein the user plane packet includes data corresponding to a transmission control protocol (TCP) acknowledgment (ACK).

18. The apparatus of claim 16, wherein the user plane packet includes data corresponding to one or more video frames.

19. The apparatus of claim 13, wherein the user plane packet includes a dummy packet transmitted by the RAN node.

20. An apparatus of a radio access network (RAN) node, comprising:

one or more data storage devices configured to store data corresponding to mapping of quality of service (QoS) flows to data radio bearers (DRBs); and one or more processors configured to encode a user plane packet corresponding to a QoS flow to be transmitted to a user equipment (UE) through a DRB, the user plane packet including an override bit, the override bit configured to indicate to the UE whether reflective mapping, wherein the UE is to use a same DRB for the QoS flow in an uplink (UL) as was used to receive the user plane packet corresponding to the QoS flow in the downlink (DL), should take precedence over explicit mapping of the QoS flow to one of the DRBs.

21. The apparatus of claim 20, wherein the user plane packet includes data corresponding to a transmission control protocol (TCP) acknowledgment (ACK).

22. The apparatus of claim 20, wherein the user plane packet includes data corresponding to one or more video frames.

23. The apparatus of claim 20, wherein the user plane packet comprises a dummy packet configured to instruct the UE regarding reflective mapping rather than deliver a data payload to the UE.

24. The apparatus of claim 20, wherein the one or more processors are configured to encode a radio resource control (RRC) message to be transmitted to the UE, the RRC message configured to explicitly indicate mapping of the QoS flows to the DRBs in the UL.

* * * * *